April 12, 1949. R. K. LE BLOND ET AL 2,466,814
LATHE HEADSTOCK GEAR SHIFTING MECHANISM
Filed March 29, 1943 5 Sheets-Sheet 3
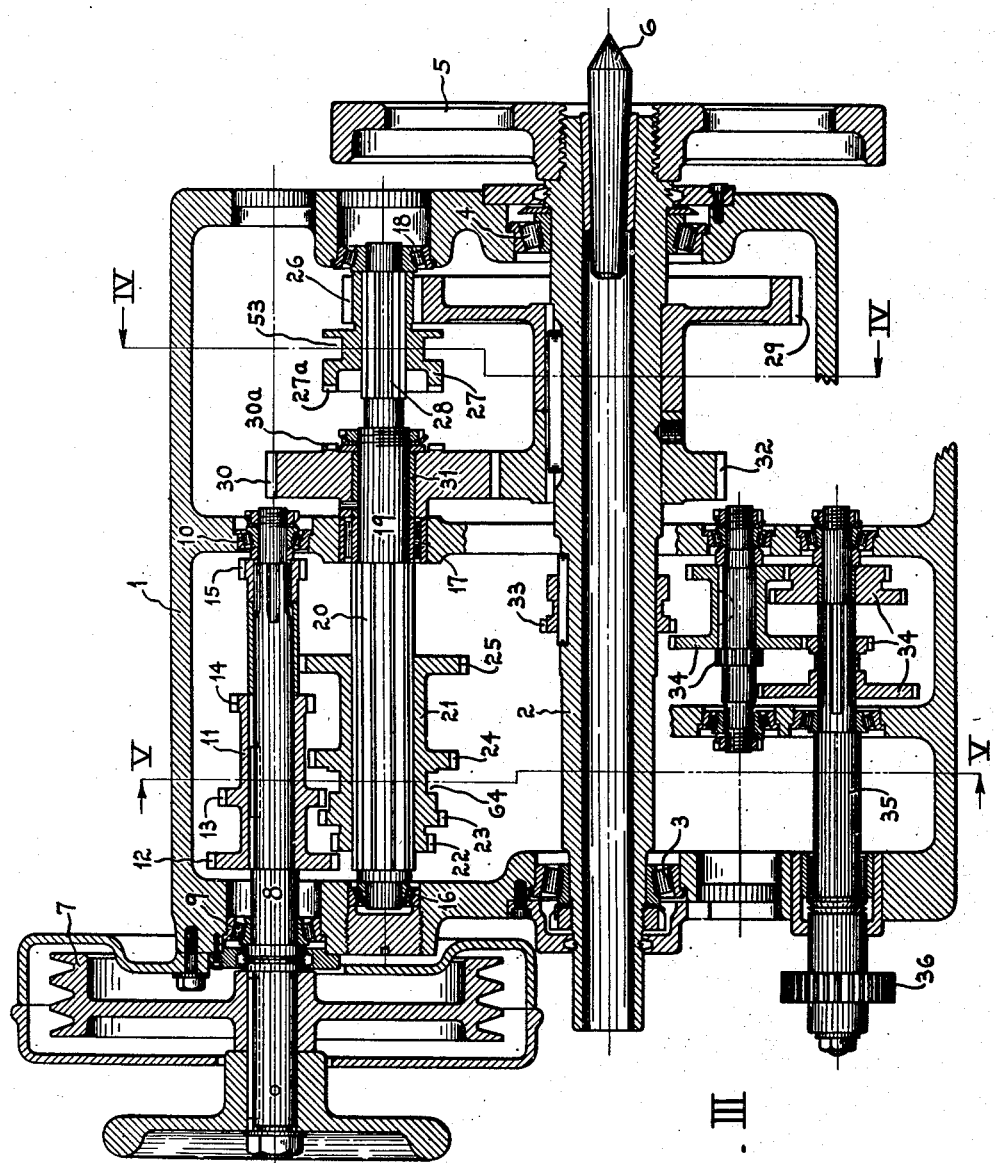
FIG. III
INVENTORS.
RICHARD K. LE BLOND
HARRY C. KEMPER
BY Willard S. Grove
ATTORNEY.

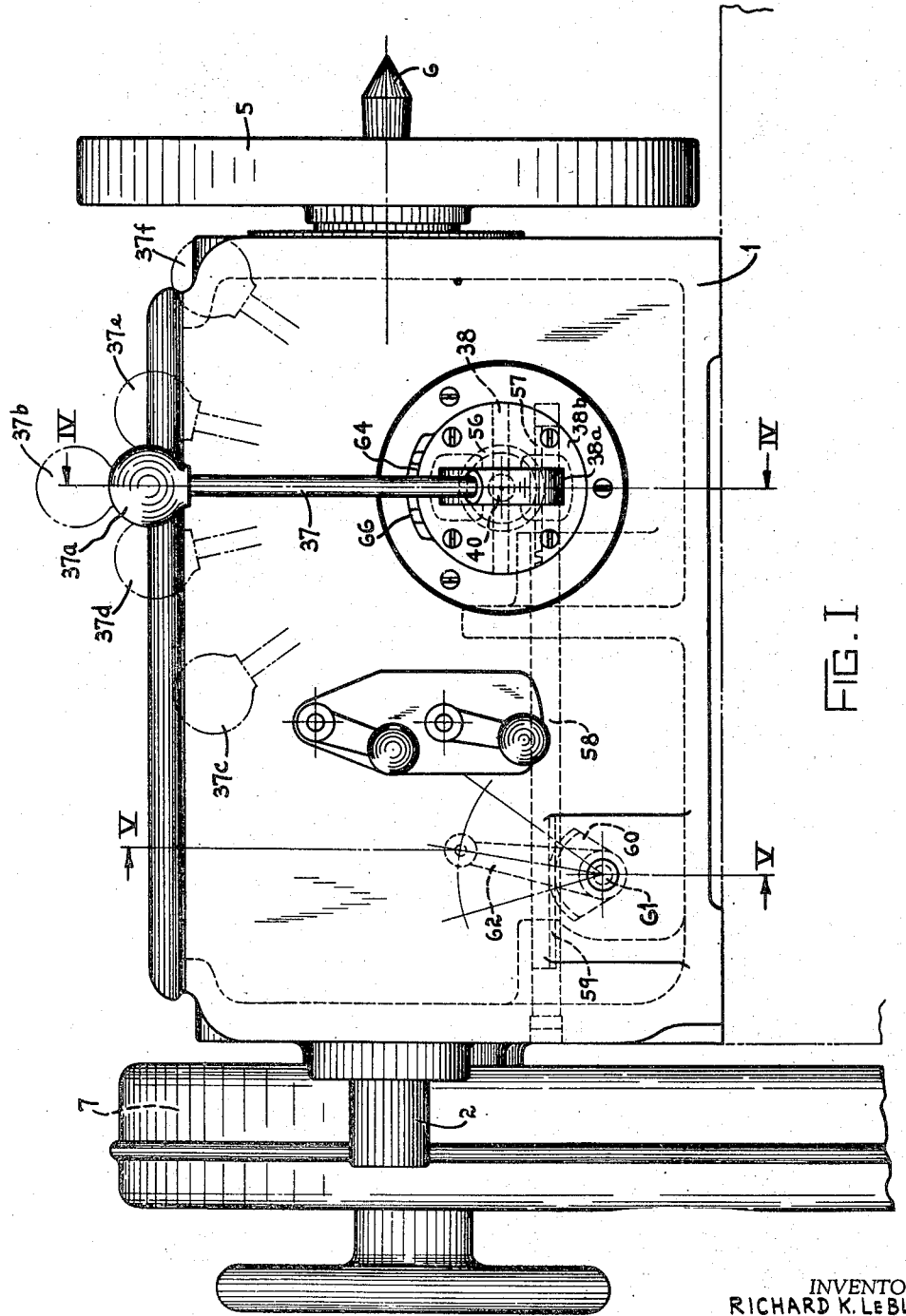

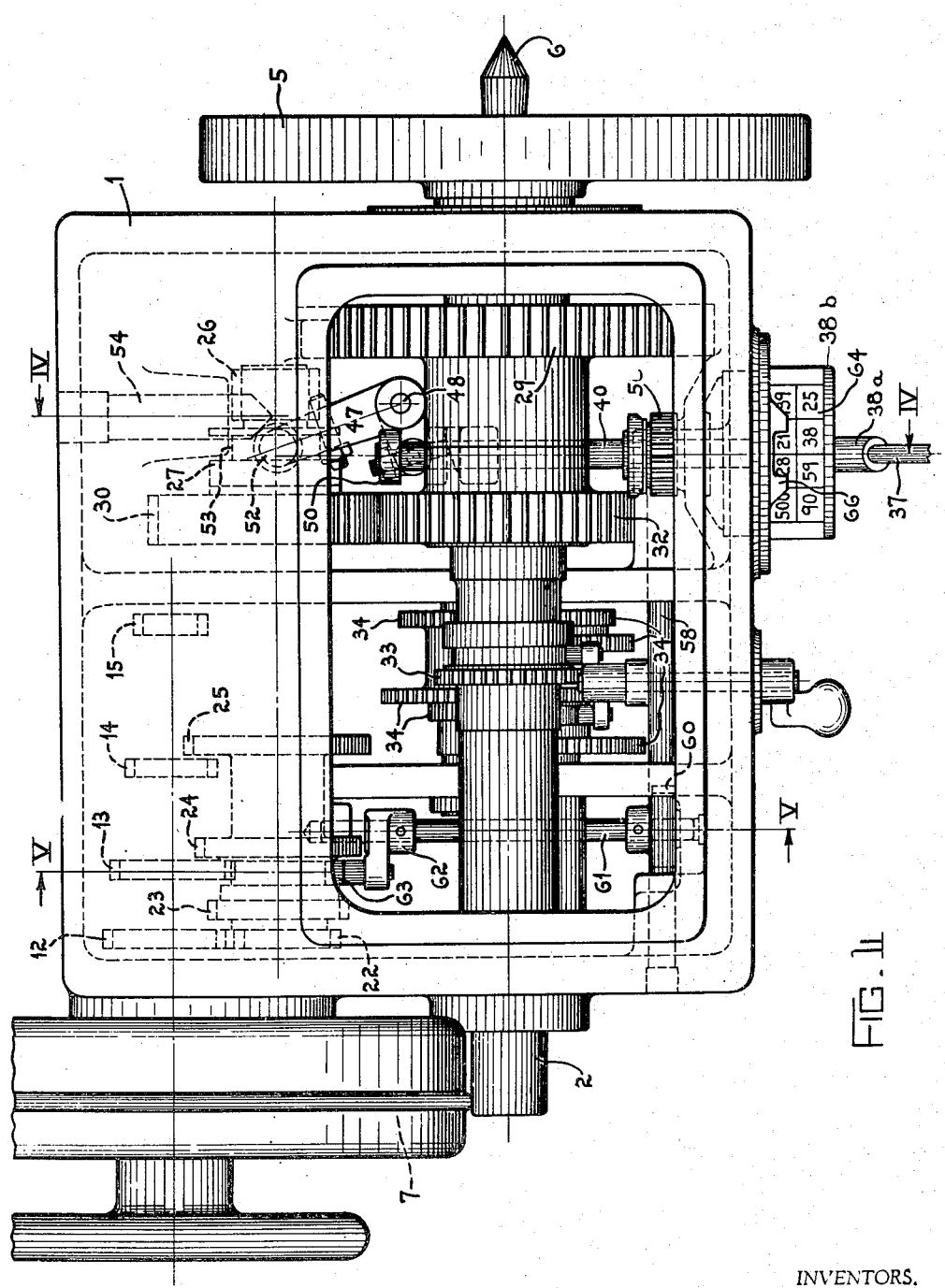

April 12, 1949.  R. K. LE BLOND ET AL  2,466,814
LATHE HEADSTOCK GEAR SHIFTING MECHANISM
Filed March 29, 1943  5 Sheets-Sheet 4
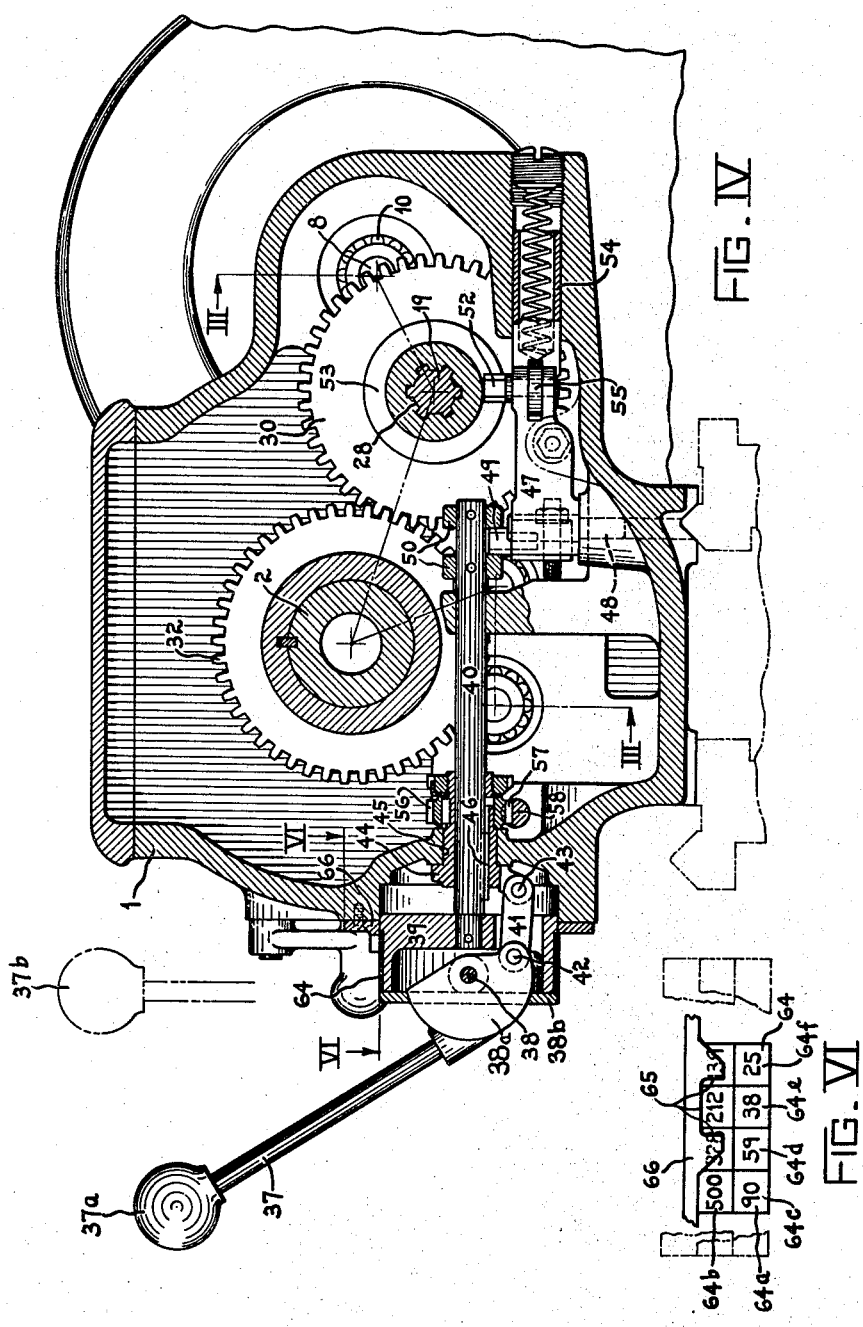
INVENTORS.
RICHARD K. LeBLOND
HARRY C. KEMPER
BY Willard S. Grove
ATTORNEY.

April 12, 1949.  R. K. LE BLOND ET AL  2,466,814
LATHE HEADSTOCK GEAR SHIFTING MECHANISM
Filed March 29, 1943  5 Sheets-Sheet 5
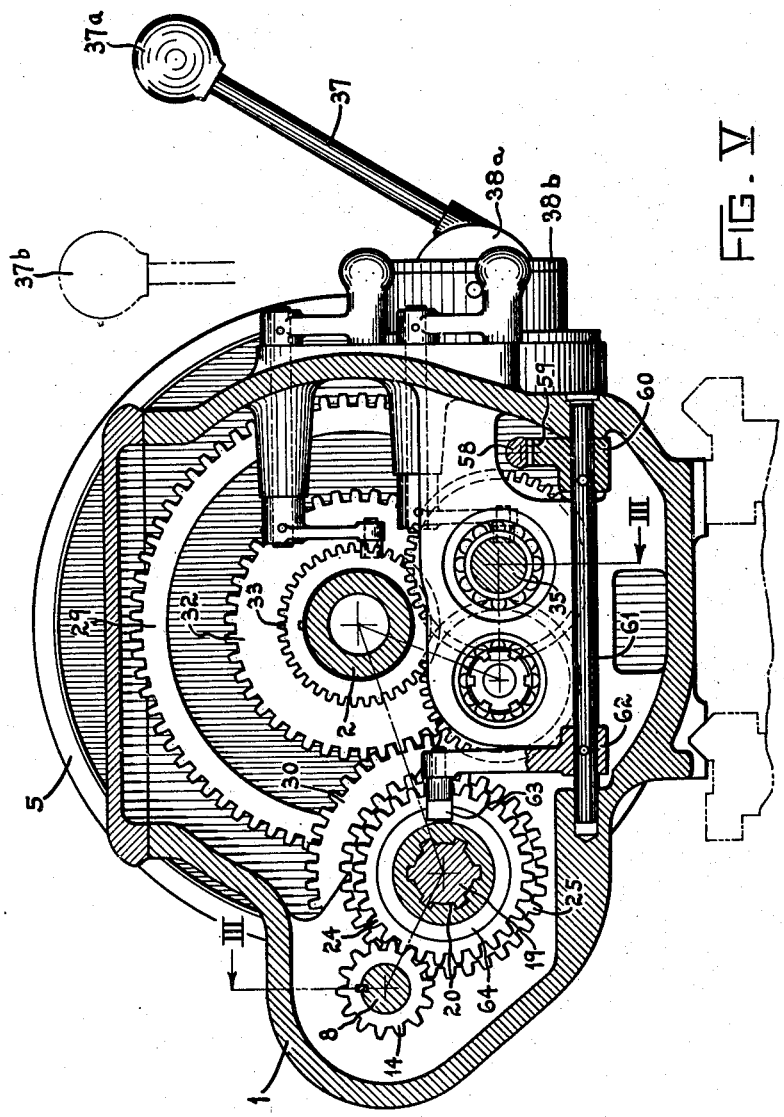
FIG. V
INVENTORS.
RICHARD K. LE BLOND
HARRY C. KEMPER
BY Willard S. Groene
ATTORNEY.

Patented Apr. 12, 1949

2,466,814

UNITED STATES PATENT OFFICE 2,466,814

LATHE HEADSTOCK GEAR SHIFTING MECHANISM

Richard K. Le Blond, Cincinnati, and Harry C. Kemper, Goshen Township, Clermont County, Ohio, assignors to The R. K. Le Blond Machine Tool Company, Cincinnati, Ohio, a corporation of Delaware Application March 29, 1943, Serial No. 480,916

7 Claims. (Cl. 74—333)

This invention pertains to improvements in lathe headstock gear shifting mechanism and is particularly related to simplified mechanism providing a single handle control for effecting all of the speed changes in the headstock gear transmission.

More particularly this invention pertains to a single handle control arrangement wherein movement in and out toward or from the headstock of the control lever automatically engages or disengages the back gear of the headstock whereas circular arcuate swinging motion of the control lever sideways effects the fine increments of speed change for either the back gear or the high speed drive for the lathe work spindle.

It is also a further object to provide in conjunction with this single lever control mechanism a simplified dial indicating mechanism for quickly effecting the desired speed selection from the headstock transmission. Further features and advantages of this invention will appear from the detailed description of the drawings in which:

Figure I is a front elevation of a typical engine lathe headstock showing the single lever control mechanism associated therewith.

Figure II is a plan view of the lathe headstock of Figure I with the top cover of the headstock removed, particularly showing the relative position of the various gear mechanisms of the transmission together with the single lever actuating handle and indicating dial associated therewith.

Figure III is a diagrammatic sectional view showing the entire headstock transmission gear change on the line III—III of Figures IV and V.

Figure IV is a transverse section through the headstock transmission on the line IV—IV of Figures I, II, and III, particularly showing the actuating mechanisms for effecting the back gear or high speed drive with the in and out motion of the single control lever.

Figure V is a transverse sectional view through the lathe headstock transmission shown on the line V—V of Figures I, II, and III particularly showing the mechanism associated with the single control lever for effecting the fine increments of speed changes in the transmission.

Figure VI is a fragmentary diagrammatic view of the dial indicating mechanism associated with the single lever control mechanism as indicated by the line VI—VI in Figure IV.

Referring particularly to Figure III the headstock comprises a support or housing 1 in which is mounted the work shaft or spindle 2 on suitable anti-friction bearings 3 and 4 and which spindle carries the usual face plate 5 and work center 6. The power drive for driving the headstock transmission is derived from a suitable electric motor and belt (not shown) which rotates the driving pulley 7 fixed to the high speed input shaft 8 mounted on suitable bearings 9 and 10 in the headstock housing 1. On this input shaft 8 is fixed a triple gear 11 comprising the gears 12, 13, and 14, and also fixed on the shaft 8 is a smaller gear 15. Journaled in the headstock housing 1 on bearings 16, 17, and 18, is the intermediate shaft 19 having a splined portion 20 upon which is slidably mounted the quadruple gear 21 having the respective gears 22, 23, 24, and 25 and having a suitable splined bore slidably mounted in driving relationship on the splined portion 20 of the shaft 19. When the gear 21 is slid on the shaft 19 the respective gears 12—22, 13—23, 14—24, or 15—25 may be respectively brought into engagement so as to provide four different rates of speed of rotation for the shaft 19 from the constant speed input shaft 8.

Power is transmitted from the intermediate shaft 19 to the work spindle 2 through a back gearing drive comprising the pinion gear 26 formed on the clutch sleeve 27 slidably mounted in driving relationship on the splined portion 28 of the shaft 19, which engages the large face gear 29 fixed to the work spindle 2. This drive from the shaft 19 through the gearing 26—29 provides a slow speed powerful back gear drive for the work spindle to effect having roughing cuts for turning relatively large diameter work. This slow speed drive may be effected at four different rates of speed by shifting the quadruple gear 21 as described.

In instances where a higher speed drive is desired for the spindle 2 the gear 30 which is freely journaled on the shaft 19 by suitable bearing 31 and which is in mesh with the high speed driving gear 32 fixed on the work spindle 2 may be positively locked in driving relationship on the shaft 19 when the gear 26 is disengaged from the gear 29 by sliding the clutch sleeve 27 to the left in Figure III to engage its clutch teeth 27a with mating clutch teeth 30a formed on the gear 30. Likewise a high speed drive through the gearing 30—32 to the work spindle may be effected at a plurality of four different rates of speed by again shifting the gear 21 to the corresponding meshing positions with the gears on the input shaft 8 as described.

Thus the gear 21 provides a first means for effecting a variable speed driving connection between the input shaft 8 and the intermediate shaft 20 while the clutch gear member 27 provides a second means for effecting a variable speed driving connection between the intermediate shaft 19 and the work spindle 2. It will be noted that these two members 21 and 27, forming a pair of variable speed units, are connected in series to convey driving power from the pulley 7 to the work spindle 2.

Suitable feeding power takeoff from the work spindle from the gear 33 may be transmitted to the feed gearing indicated generally at 34 which transmits feeding power out through the feed takeoff shaft 35 and through suitable change gearing 36 to the apron mechanism of the lathe. Such power takeoff is not described in detail herein since it forms no part of this invention.

The quadruple gear 21 and the clutch sleeve 27 containing the gear 26 and clutch teeth 27a may be selectively actuated from a single control lever to obtain all of the speed changes desired for the work spindle 2. This mechanism comprises a single control lever 37 pivotally mounted through a sector-shaped plate 38a on a pivot pin 38 carried in a revolving hub or hollow drum 39 fixed on the end of a rock shaft 40 and having a link 41 connected by means of a pin 42 to the lever 37 and which link 41 in turn is connected by means of a pin 43 to the revolving sleeve 44 journaled in a suitable bearing 45 in the headstock housing 1. A suitable cover 38b closing the drum member 39 has a slot contacting the sides and arcuate periphery of the sector-shaped plate 38a. This sleeve 44 is keyed by means of a key 46 to the rock shaft 40 so that it rotates with it yet permits the rock shaft 40 to be slid axially therein.

The control lever 37 is arranged to be moved toward and from the headstock between the positions 37a or 37b whereupon through the medium of the link 41 connected to the sleeve 44 confined axially in the bearing 45 of the headstock 1 to thereby cause axial sliding of the shaft 40. This motion of the lever 37 to position 37a or 37b effects the shifting of the back gear clutch sleeve 27 through the bell crank lever 47 which is pivotally mounted on a pin 48 fixed in the headstock housing 1 and has a pin 49 in the end of one of its arms which nicely fits between the actuating collars 50 fixed on the rock shaft 40. The other arm of the bell crank lever 47 likewise carries a pin 52 which engages in the annular slot 53 formed in the clutch sleeve 27 so that pushing the lever 37 in and out causes rocking of the bell crank lever 47 and likewise the shifting of either gear 26 into engagement with gear 29 or the clutch teeth 27a into engagement with the clutch teeth 30a of the gear 30 referring particularly to Figure III.

Suitable detent mechanism comprising the spring urged plunger 54, Figures II and IV, which engages the detent roller 55 carried in the bell crank lever 47 so as to cause the lever to be held in either one or the other of the positions 37a or 37b with the corresponding gear meshing positions 26—29 or clutch teeth 27a—30a.

The lever 37 may also be moved to the positions 37c, 37d, 37e, and 37f so as to effect the finer increments of speed change by moving the quadruple gear 21 on the shaft 19. Referring particularly to Figure IV the sleeve 44 has fixed on it a pinion gear 56 which engages rack teeth 57 on a shifter rod 58 slidably mounted in the headstock housing 1. This rod 58 has a second series of rack teeth 59 which engage the segmental gear 60 fixed on the rock shaft 61 journaled in the headstock housing 1. The rod 61 has fixed on it a lever 62 carrying a shifter shoe 63 which engages in the annular slot 64 formed in the quadruple gear 21 so that swinging motion of the lever to the various positions shown in Figure I effects the sliding of this gear 21 to effect the various gear engagements 12—22, 13—23, 14—24, and 15—25.

Associated with the control lever 37 is dial indicating mechanism best shown in Figures II and VI. This comprises an indicating dial 64 mounted on the upper periphery of the drum piece 39 fixed to rock shaft 40 and which is moved to the four positions of fine speed changes by rocking of the lever from the position 37c to 37f as shown in Figure I and comprising the spacings 64c, 64d, 64e, and 64f. Likewise the drum piece may be moved in and out to bring the two columns of figures of indicating speeds 64a and 64b to their corresponding indicating positions in a window formed by the slot 65 in the indicating bracket 66 fixed to the headstock housing 1. This movement also shifts rock shaft 40 axially so that columns 64a and 64b correspond to the two axial positions of said shaft. Thus with this arrangement direct reading of any speed desired may be obtained by the simple manipulation of the control lever 37 for obtaining a series of back gear speeds with the handle moved to the position 37b or to a series of high speeds with the handle moved out to the position 37a and swinging the handle as shown in Figure I to give the desired finer increments of speed changes in the high or lower range selected.

Having thus fully set forth and described our invention what we claim as new and desire to secure by United States Letters Patent is:

1. In a headstock transmission having fine increments or speed changes and a back gear speed change for the work spindle thereof, a single lever control mechanism for effecting the changes of said fine increments and said back gear speed change comprising a rock shaft journaled in said headstock for rotating and axial sliding on and along an axis perpendicular to the spindle axis of said lathe, a rocking sleeve around said rock shaft and slidably keyed thereon and journaled in said headstock, a drum fixed on said rock shaft, a control lever mounted on said drum for rocking movement in a plane passing through the axis of rocking of said rock shaft, a link connecting said rocking lever to said sleeve, whereby rocking of said lever slides said shaft axially in said headstock and swinging of said lever with said drum causes said rock shaft to rotate, means connecting the axial movement of said rock shaft to the back gear change mechanism of said headstock, and means connecting said swinging motion of said sleeve to the finer increment speed changes of said headstock.

2. In a machine tool, the combination of a support, a drive on said support comprising a multiple-speed mechanism having first and second interconnected shiftable units, a sleeve journaled in said support, a rock shaft journaled in said sleeve for axial movement with respect to said sleeve and positive rotation therewith, a drum fixed on said shaft, a lever pivoted on said drum on an axis transverse to said shaft, a link connection between said lever and sleeve, connections operated by one component of movement of said lever to slide said shaft and thereby actuate said first unit, and connections operated by another component of movement of said lever to rotate said shaft and said sleeve to actuate said second unit.

3. In a machine tool, the combination of a support, a drive on said support comprising a multiple-speed mechanism having first and second interconnected shiftable units, a sleeve journaled in said support, a rock shaft journaled in said sleeve for axial movement with respect to said sleeve and positive rotation therewith, a drum fixed on said shaft, a lever pivoted on said drum on an axis transverse to said shaft, a link connection between said lever and sleeve, connections operated by one component of movement of said lever to slide said shaft and thereby actuate said first unit, and connections operated by another component of movement of said lever to rotate said shaft and said sleeve to actuate said second unit, there being circumferential rows of axially-spaced indicia on said drum, and an indicator on said support coacting with said indicia.

4. In a machine tool, the combination with a support, a multiple-speed mechanism on said support having interconnected first and second variable-speed units, a sleeve journaled in said support, a shaft connected to rotate said sleeve and to slide axially there along, a drum fixed on said shaft concentrically thereof, a lever pivoted on said drum on an axis transverse to and intersecting the axis of said shaft and sleeve, means pivotally connecting said sleeve and lever, there being indicia on said drum coacting with an indicator on said support, connections operating said first unit by sliding of said shaft, and connections operating said second unit by rotation of said sleeve.

5. In a machine tool, a support, a drive shaft, an intermediate shaft, and a work shaft, all said shafts being journaled in said support, a first variable speed connection between said drive and said intermediate shafts, a second variable speed connection between said intermediate and said work shafts, a sleeve journaled in said support, a rock shaft journaled in said support and sleeve for rotation and axial sliding movements, a drum fixed upon one end of said rock shaft, said drum having circumferential rows of axially spaced indicia, a lever pivoted on said drum on an axis normal to, and concurrent with the axis of said shaft, key means to cause said sleeve to rotate with said shaft, link means connecting said shaft and sleeve to slide said shaft, means operated by sliding of said shaft to actuate said first variable speed connections, and means operated by rotation of said sleeve to actuate said second variable speed connection.

6. An adjustment and indicator mechanism for variable speed drives, a support, a sleeve journaled in said support, a rock shaft slidably splined within said sleeve and connected to effect speed changes of said drive both by rotation of said shaft and sleeve, and sliding of said shaft, a drum fixed on said shaft, a lever pivoted on an axis diametrical of said drum and transversely of said shaft, a link connection between said lever and sleeve whereby said shaft is moved axially when said lever is moved in a plane passing through the axis of said shaft, circumferential, axially-spaced rows of indicia upon the surface of said drum, and an indicator fixed to said support, to indicate a row of indicia selected by axial movement of said shaft, and the indicium of said row selected by rotation of said shaft.

7. In an indicator for the variable speed drive of machine tools, a support, a sleeve journaled against axial movement in said support, a rock shaft mounted in said support and sleeve for rotation and axial sliding movement, a hollow drum having a circular base fixed on said shaft concentric thereof, a lever having a sector-shaped plate on one end, a pin extending diametrically across and within said drum through the center of said sector, a cover closing said drum and having a slot contacting the sides and arcuate periphery of said plate, a link pivoted to said plate and swivelly connected to said sleeve through a slot in the base of said drum, and circumferential, axially-spaced rows of indicia on said drum.

RICHARD K. LE BLOND.
HARRY C. KEMPER.

REFERENCES CITED

The following references are of record in the file of this patent:

UNITED STATES PATENTS

| Number | Name | Date |
|---|---|---|
| 1,315,722 | Hazelton | Sept. 9, 1919 |
| 1,686,383 | Klausmeyer | Oct. 2, 1928 |
| 1,743,649 | Armitage | Jan. 14, 1930 |
| 1,817,724 | Van Hamersveld | Aug. 4, 1931 |
| 1,991,349 | Gallimore | Feb. 12, 1935 |
| 1,997,841 | Twamley | Apr. 16, 1935 |
| 2,277,643 | Holmes | Mar. 24, 1942 |
| 2,278,263 | Hoelscher | Mar. 31, 1942 |
| 2,297,422 | Mobius et al. | Sept. 29, 1942 |
| 2,332,381 | Hoelscher | Oct. 19, 1943 |
| 2,338,121 | Le Blond et al. | Jan. 4, 1944 |

FOREIGN PATENTS

| Number | Country | Date |
|---|---|---|
| 268,456 | Great Britain | Sept. 7, 1927 |